United States Patent [19]

Lachance

[11] 4,103,953

[45] Aug. 1, 1978

[54] PORTABLE ANIMAL SANITARY DEVICE

[76] Inventor: Gilles Raoul Lachance, 56 Place Montmorency, Laval, Canada, H7N 1T6

[21] Appl. No.: 829,584

[22] Filed: Aug. 30, 1977

[51] Int. Cl.² ............................................. A01K 29/00
[52] U.S. Cl. ................................... 294/19 R; 294/1 R
[58] Field of Search ................... 294/19 R, 1 R, 55; 75/257.1, 257.4, 257.6, 257.7, 257.9; 56/332, 337, 339; 119/1

[56] References Cited

U.S. PATENT DOCUMENTS 4,003,595  1/1977  Fano et al. .......................... 294/19 R
4,010,970  3/1977  Campbell ............................ 294/19 R Primary Examiner—James B. Marbert

[57] ABSTRACT

A portable animal sanitation device of one-piece frame construction having a handle at the top end, a straight section, and an annular section provided with an opening. The frame is provided with a long wire spring slidably displaceable along the straight and annular sections and has a stop at its lower end. A disposable bag has a hem for attachment to the annular section. For removal, the wire spring is downwardly displaced and its stop pushes the disposable bag around and off the annular rim for subsequent disposal.

2 Claims, 4 Drawing Figures

U.S. Patent  Aug. 1, 1978  4,103,953
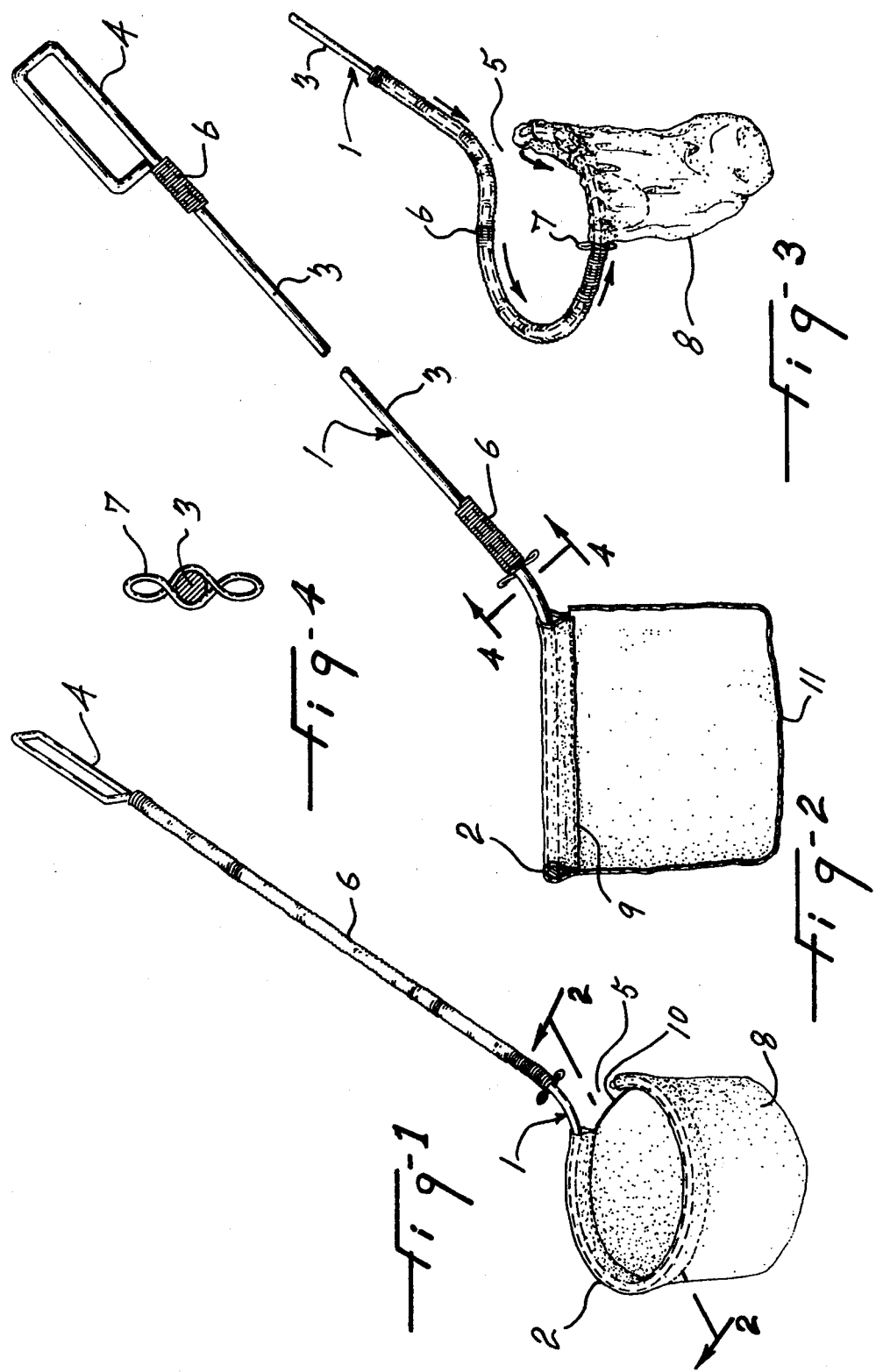

PORTABLE ANIMAL SANITARY DEVICE

This invention deals with an animal sanitation device, more particularly one of the type commonly known as an animal toilet.

There have been many devices heretofore in the prior art designe to collect or pick up animal feces, particularly those of dogs. These various devices usually employ some kind of container, disposable or not, coupled with a scoop or shovel apparatus for removing feces already on the ground. The main drawback of these devices, apart from expensive or bulky or unwieldy design, is that their specific purpose is to clean up a surface already soiled by an animal, thus excluding any possibility of preventing the surface to be soiled in the first place. Furthermore, such devices fail to entirely clean the soiled surface, especially if the surface is a grass lawn where dog feces are most commonly found.

There also exist various types of animal toilets. But these are usually heavy and complicated of design, or require the manufacture of a very special type of disposable insert which proves to be expensive to produce. Such devices may also require the use of both hands, making simultaneous control of a dog on a leash almost impossible. There are also devices designed to be connected to the main sewage system of a house, but these, besides not being portable, are evidently restricted to those who can afford such a costly item.

Accordingly, it is an object of the present invention to provide a portable animal sanitation device which is easy to operate and inexpensive to manufacture.

It is a further object of the present invention to provide a portable animal sanitation device requiring the use of only one hand and having disposable container means, easily attachable and removable without manual contact.

These objects are accomplished in accordance with a preferred embodiment of the invention having a light frame, preferably of aluminum or other light material which has a handle at one end and is formed into a partial annular section at the opposite end. The frame includes a spirally and closely wound fine spring wire along its straight portion and the spring wire is provided with an abutment at its end adjacent to the annular section. The spring wire is slidable for displacement onto the annular section, thus effecting removal by pushing action of a disposable container means.

The disposable container means consists of a bag made of plastic or other suitable material with a hem for introduction into the partial annular section of the frame.

The foregoing will be more clearly understood by referral to the accompanying drawings of the preferred embodiment of the invention, in which:

FIG. 1 is a perspective view of the device showing the disposable bag in place for use;

FIG. 2 is a partially sectioned side view taken along line 2—2 of FIG. 1 and showing the straight portion of the frame;

FIG. 3 is a perspective view of the annular section showing the disposable bag being removed; and FIG. 4 is a cross-sectional view taken along line 4—4 of FIG. 2.

Like numerals refer to like elements throughout the drawings.

A frame 1, preferably made of aluminum, includes a partially annular section 2 having a rearward opening 5, thus forming a partially open loop, a straight section 3 extending at an obtuse angle to the plane of annular section 2, and a handle 4 at the outer end of straight section 3. Straight section 3 is provided with a spirally and closely wound wire spring 6 having an abutment 7 at its lower end in the shape of a bow, as best seen in FIG. 4. In its inoperating position, wire spring 6 extends from the handle 4 to a point just above annular section 2 and is slidable along the frame 1.

A disposable plastic bag 8 has a hem 9 provided all along its top, except for a short segment 10, permitting the bag to be introduced onto the annular section 2. This is done by progressively sliding the hem 9 around the annular section 2, so that the bag 8 assumes a ready-for-use position, as shown in FIG. 1. The bag thus has a top opening of the same dimension as annular section 2 and includes a bottom 11 to receive animal wastes, as shown in FIG. 2.

Removal of plastic bag 8 for disposal when it is full is equally simple. With a hand (not illustrated in the drawings), wire spring 6 is slid down straight section 3 of frame 1, thus pushing bow 7 at the lower end of wire spring 6 against the end of hem 9 positioned at the juncture of straight section 3 and annular section 2. Bow 7 prevents wire spring 6 from sliding into the hole of hem 9. Then, by further sliding wire spring 6 down straight section 2 and around annular section 3, bag 8 is pushed off annular section 2, as shown in FIG. 3, and thereafter easily disposed of with its contents. To complete the procedure, the device is prepared for a new bag by retracting wire spring 6 back around annular section 2 and up straight section 3 to its original position as in FIG. 1.

It is to be noted that the present invention obviates the need for any kind of cleaning or maintenance, as the disposable bag is the only part to come into contact with waste matter, and there is only one moving part, the wire spring, which clearly is extremely durable and long-lasting in the context of its function.

In addition, this invention is lightweight and inexpensive, including an inexpensively-manufactured disposable bag.

What I claim is:

1. A portable animal sanitation device comprising a rigid, one-piece, rod-like frame including a straight handle section integrally joined at one end to one end of an annular section having a free end terminating short of and adjacent the junction of said straight and annular sections, said annular section lying in a plane making an obtuse angle with said handle section, a spirally wound spring wire surrounding said frame and slidable along the same between an inoperative position in which said spring wire is substantially co-extensive with said handle section and terminates at said junction, and an operative position in which the spring wire extends along both said handle section and said annular section and terminates close to said free end of said annular section, and a disposable bag having a hem at its top edge extending along the greater part of the length of said top edge and opened at both its ends and removably receiving said annular section, whereby said frame carries said bag, movement of said spring wire along said frame from said inoperative position to said operative position causing said wire to push against said hem and to cause said bag to come off said annular section.

2. A portable animal sanitation device as claimed in claim 1, wherein the end of said wire disposed adjacent said junction in the inoperative position of said spring wire forms an enlargement of said coil spring to provide an abutment adapted to engage against one end of the hem of said bag.

* * * * *